D. C. COLBY.
Rotary-Harrow.
No. 28,938.
Patented June 26, 1860.
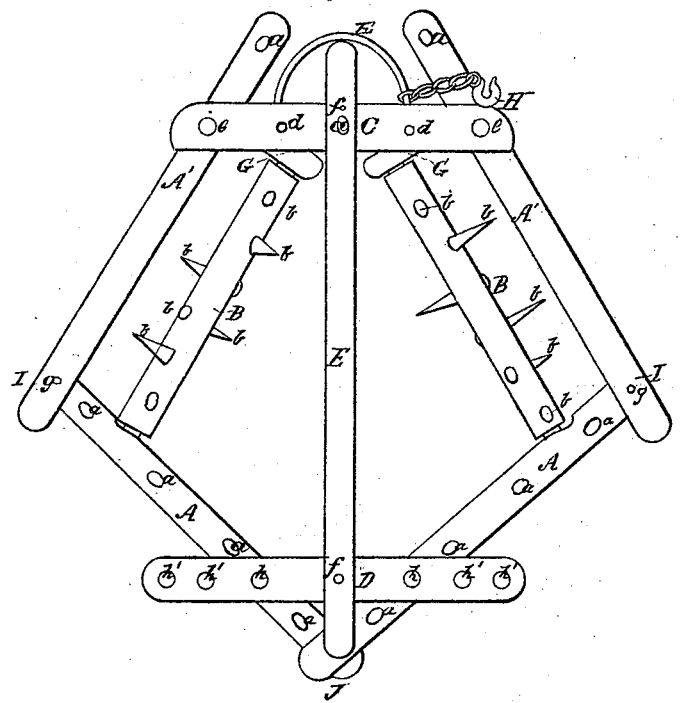
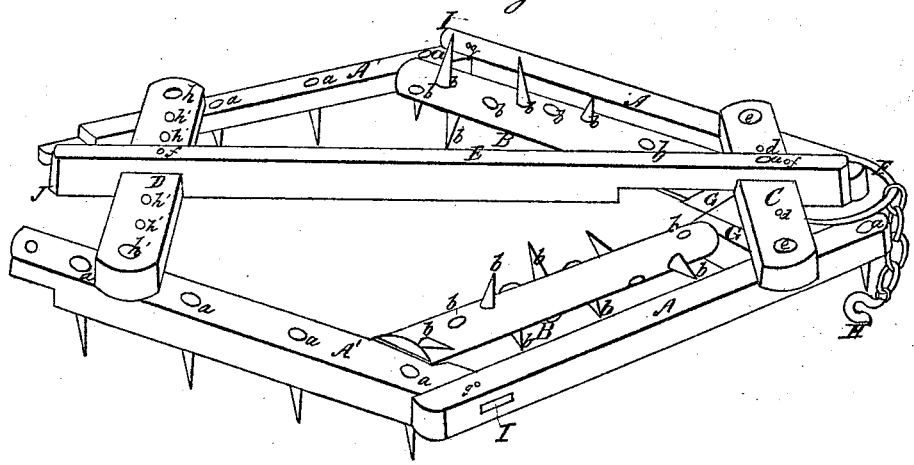
Witnesses:
Inventor:

UNITED STATES PATENT OFFICE.

DANIEL C. COLBY, OF NEWPORT, NEW HAMPSHIRE, ASSIGNOR TO HIMSELF AND JAMES P. UPHAM.

IMPROVEMENT IN HARROWS.

Specification forming part of Letters Patent No. 28,938, dated June 26, 1860.

*To all whom it may concern:*

Be it known that I, DANIEL C. COLBY, of Newport, in the county of Sullivan and State of New Hampshire, have invented certain new and useful Improvements in the Agricultural Implement known as the "Harrow;" and I do hereby declare that the following is a full, clear, and exact description of the construction and mode of operation of the same, reference being had to the annexed drawings, making a part of this specification, in which—

Figure 1 is a top view of the entire harrow, and Fig. 2 is a perspective view of the same.

The same letters in the two figures indicate corresponding parts of the implement.

A A are the front, and A' A' are the rear, side pieces or beams constituting the frame of the harrow, mortised together at I I and confined by the bolts $g$ $g$, in which are inserted the teeth $a$ $a$, &c., made in the usual form and of the usual material, and of such size as the nature of the work may demand.

B B are rollers arranged diagonally with the line of draft, in which teeth are inserted, as seen in the drawings at $b$ $b$, &c., the journals of one end of each of which are inserted in the bearings G G, projecting from the side pieces A A, and those of the other end in the side pieces A' A'. Rollers thus constructed may be combined and arranged in the same manner with harrows constructed in other forms.

C is a cross-brace connecting the side pieces A A, and D is a cross-brace connecting the side pieces A' A'.

E is a bar connecting the cross-braces C and D, to which it is confined by mortises and bolts $f$ $f$, and is designed to give strength and stability to the frame of the harrow. Its form and construction may be more particularly seen in Fig. 2. A tooth penetrates the connecting-bar E and the cross-brace C at $a$. The cross-brace C is confined to the side pieces A A by the bolts $e$ $e$, upon which the side pieces A A freely play when the harrow is expanded or contracted.

$d$ $d$ are the bolts by which the draft-rod F, which is made in the form of a semicircle or semi-ellipse, is confined to the cross-brace C.

The side pieces A' A' are not permanently united at the rear of the harrow J, but are connected by the cross-brace D and the bolts $h$ $h$, and permit of expansion and contraction, as may be required, which is effected by removing the bolts $h$ $h$, as seen in Fig. 1, to either of the holes or perforations $h'$ $h'$, as seen in Fig. 2, in which the side pieces A' A are expanded to their utmost capacity by inserting the pieces $h$ $h$ in the outer perforations, $h'$ $h'$. By this method, when the harrow is expanded the two lower permanent teeth $a$ $a$ in the side pieces A' A' are thrown outside of the line of the two teeth $a$ $a$ in the side pieces A A, the two latter teeth being thrown in toward the center line of the harrow in proportion as the two former teeth are thrown out from the center line. In contracting the harrow the relative positions of these two couples of teeth are reversed. Thus no portion of the soil is left untouched by the teeth.

H is a draft-chain attached to the draft-rod F.

I insert the teeth $a$ $a$ in the side pieces, A A and A' A', (one being inserted in the connecting-bar E and cross-brace C,) in such a manner as no two of them shall follow in the same track, whether the harrow is expanded or contracted.

Having set forth the construction of my improved harrow, I now proceed to describe its operation. The great purpose of all such implements is to thoroughly work and pulverize the soil. The teeth $a$ $a$, &c., inserted in the frame of the harrow operate as ordinary harrow-teeth, in a direct line with the line of draft, but arranged in such a manner that no two of them will run in the same track. The teeth $b$ $b$, &c., of the rollers B B have a different motion and produce different effects, the rollers being arranged diagonally to the line of draft. The teeth $b$ $b$, &c., have not only a dragging but a rotating and lifting motion, which thoroughly loosens and pulverizes the soil and prepares it for the action of the permanent teeth in that part of the frame behind the rollers, which follow after and both stir and smooth the soil. The teeth $b$ $b$, &c., of the rollers also by this arrangement cut the soil diagonally to the track made by the teeth $a$ $a$, &c. By this arrangement a very thorough and efficient stirring and pulverization of the earth is effected.

By means of the cross-brace D the bolts $h$ $h$ and the perforations $h'$ $h'$, &c., the harrow may be expanded or contracted to such width as may be required by the nature of the work to be performed.

Another advantage I gain in the construction of my improved harrow is by my device of the semicircular or semi-elliptical draft-rod F, to which the beam is attached by the draft-chain H, which is so arranged as to play freely on the rod F, sliding from one side to the other of the same, as affected by the obstructions which the harrow may encounter, or by the movements of the team. This device permits the harrow to be thrown about by stones, stumps, roots, or other obstructions, so as not to injure or worry the team. It also enables the team to turn the harrow more readily and easily at the ends or corners of the land which is undergoing the operation of harrowing, and without liability to be overturned.

I do not claim the use of toothed rollers independent of their combination or arrangement with other parts of the harrow, nor do I claim the extension-harrow as such; but What I do claim, and desire to secure by Letters Patent, is—

1. The arrangement of the toothed rollers B B (and more than two if need be) at a greater or less angle with the line of draft, so that the teeth of the rollers shall cut the soil diagonally to the lines made by the stationary teeth $a$ $a$, &c., in the frame of the harrow.

2. The frame of the harrow, composed of the side pieces, A A and A' A', the cross-braces C and D, and the connecting-bar E, arranged as above described, so that the angle of the rollers B B with the line of draft and the width of the harrow may be varied when desired, thereby throwing the lines described by the two rear permanent teeth $a$ $a$ in the side pieces A' A' outside or inside (as the case may be) of the lines described by the two permanent teeth $a$ $a$ in the side pieces A A.

DANIEL C. COLBY.

Witnesses:
EDMUND BURKE,
FRANCIS M. BURKE.